United States Patent
Harris

(10) Patent No.: US 6,763,966 B2
(45) Date of Patent: Jul. 20, 2004

(54) TORQUE-LIMIT SIGNAL SYSTEM FOR FILLER NECK CAP

(75) Inventor: Robert S. Harris, Connersville, IN (US)

(73) Assignee: Stant Manufacturing Inc., Connersville, IN (US)

(*) Notice: Subject to any disclaimer, the term of this patent is extended or adjusted under 35 U.S.C. 154(b) by 0 days.

(21) Appl. No.: 09/955,350

(22) Filed: Sep. 18, 2001

(65) Prior Publication Data

US 2002/0066734 A1 Jun. 6, 2002

Related U.S. Application Data

(60) Provisional application No. 60/233,415, filed on Sep. 18, 2000.

(51) Int. Cl.[7] .............................................. B65D 41/06
(52) U.S. Cl. ............................. 220/293; 220/DIG. 33; 220/86.1; 220/86.2
(58) Field of Search .............................. 220/293, 300, 220/301, 302, 86.1, 86.2, DIG. 33, 304; 116/200, 205, 223, 309, 316, DIG. 17; 215/330, 331

(56) References Cited

U.S. PATENT DOCUMENTS

| | | | |
|---|---|---|---|
| 4,083,209 A | 4/1978 | Sloan, Jr. | |
| 4,280,346 A | 7/1981 | Evans | |
| 4,280,347 A | 7/1981 | Evans | |
| 4,765,505 A | 8/1988 | Harris | |
| 4,913,303 A | 4/1990 | Harris | |
| 5,110,003 A | 5/1992 | MacWilliams | |
| 5,449,086 A | 9/1995 | Harris | |
| 5,638,975 A | 6/1997 | Harris | |
| 5,794,806 A | 8/1998 | Harris et al. | |
| 5,924,590 A | 7/1999 | Jocic et al. | |
| 6,056,139 A | * 5/2000 | Gericke | 220/203.06 |
| 6,076,695 A | * 6/2000 | Palvoelgyi et al. | 220/DIG. 33 |
| 6,079,584 A | 6/2000 | Griffin | |
| 6,179,148 B1 | * 1/2001 | Harris | 220/288 |
| 6,206,219 B1 | * 3/2001 | Bruggenolte | 220/230 |

FOREIGN PATENT DOCUMENTS

WO   WO 00/20292   4/2000

* cited by examiner

Primary Examiner—Robin A. Hylton
(74) Attorney, Agent, or Firm—Barnes & Thornburg LLP

(57) ABSTRACT

A torque-limit signal cap for a filler neck includes a handle, a filler neck closure, and a torque-limit signaler. The torque-limit signaler operates during cap installation to interrupt temporarily a driving connection established between the handle and the closure to provide a tactile and/or auditory signal to a user turning the cap in the filler neck indicating that sufficient torque has been applied to the handle to seat the closure in a filler neck-closing position in the filler neck.

26 Claims, 5 Drawing Sheets

TORQUE-LIMIT SIGNAL SYSTEM FOR FILLER NECK CAP

This application claims priority under 35 U.S.C. 119(e) to U.S. Provisional Application Serial No. 60/233,415, filed Sep. 18, 2000, which is expressly incorporated by reference herein.

BACKGROUND AND SUMMARY OF THE INVENTION

The present invention relates to filler neck caps, and particularly to a rotatable cap for closing the open mouth of a filler neck. More particularly, the present invention relates to a filler neck closure cap designed to indicate to the user the minimum acceptable closure torque to effect a sealed position in a filler neck.

Conventional caps for closing the filler neck of a vehicle fuel tank typically include a closure member carrying a seal for closing and sealing the mouth of the filler neck and a handle for turning the closure member to mount the closure member and seal in the filler neck. A typical filler neck cap includes a ring-shaped seal made of a resilient gasket material that is compressed between the cap and a filler neck receiving the cap to establish a sealed connection between the cap and the filler neck when the cap is mounted on the filler neck.

Frequent over-tightening of a filler neck fuel cap can crush or otherwise damage the O-ring gasket which provides the seal between the cap and the filler neck. A torque-control mechanism was developed to limit positively the amount of torque which could be applied by a user in the cap-advancing direction as the user rotates the cap on the filler neck to its fully seated filler neck-closing position thereon. Thus, a torque-control mechanism helps minimize wear and tear on the O-ring gasket and preserves the sealing capability of the gasket. See, for example, U.S. Pat. No. 4,913,303 to Harris, U.S. Pat. No. 4,083,209 to Sloan, Jr., and U.S. Pat. No. 5,110,003 to MacWilliams and International (PCT) Publication No. WO 00/20292 (published Apr. 13, 2000) to Harris, the disclosures of which are hereby incorporated by reference herein.

In recent applications, however, a more pervasive problem is cap under-tightening, that is, failure of users to tighten the cap to a properly torqued installed position on a filler neck. A filler neck cap in accordance with the present disclosure is made to address the under-tightening problem.

According to the present disclosure, a filler neck cap includes a handle, a closure adapted to close a filler neck, and a torque-limit signaler coupled to the handle and the closure. The torque-limit signaler is configured to provide an audible and/or tactile and/or other receivable signal to a user (as the user is rotating a cap in a cap-advancing direction to its installed position within a tank filler neck) so that the user will be made aware that the cap has been "torqued" or "tightened" to an acceptable limit and has been installed properly within the filler neck. Once the user senses the signal produced by the torque-limit signaler, the user will know not to rotate the cap further in the cap-advancing direction and the cap therefore will be left in a properly torqued or tightened position within the filler neck.

In illustrative embodiments, the closure includes a closure base adapted to mate with the filler neck and a torque-transmission member positioned to lie between the handle and the closure base and rotate about the axis of rotation. The torque-limit signaler includes a driver coupled to the underside of the cap handle and a companion spring arm coupled to the torque-transmission member. The spring arm is arranged to maintain contact with the driver on the handle during an initial stage of cap installation in a filler neck so as to provide a torque-limited connection between the handle and the torque-transmission member during rotation of the handle about the axis of rotation in the cap-advancing direction.

Once sufficient torque has been applied to the handle about the axis of rotation and the closure base has been seated in the filler neck, the torque-limit signaler will function to provide a signal to a person rotating the handle about the axis of rotation in the cap-advancing direction that the cap has been torqued or tightened to an acceptable limit and the closure base has been installed properly within the filler neck. For example, as the person is rotating the handle in the cap-advancing direction, the driver (on the handle) will push the cantilevered spring arm (on the torque-transmission member) away to a driver-disengaged position to cause torque-transmission from the handle to the closure to be interrupted temporarily. As a result of this temporary interruption, the torque-transmission member and the closure base will not rotate about the axis of rotation in response to continued rotation of the handle in the cap-advancing direction through a small angle of about 15°.

An audible noise and/or a tactile sensation associated with such movement of the spring arm to a driver-disengaged positioned and provided to the person rotating the handle during the temporary interruption of torque-transmission from the handle to the closure will be the "signal" that the closure has been torqued or tightened sufficiently and that rotation of the handle in the cap-advancing direction is not causing the closure to rotate further in the filler neck. Once the person has rotated the handle in the cap-advancing direction through that small lost-motion angle relative to the torque-transmission member and the closure base, the driver on the handle will contact a fixed drive receiver located on the torque-transmission member while the spring arm is maintained on the driver-disengaged position to reestablish the driving (i.e. torque-transmitting) connection between the handle and closure in the filler neck.

Additional features of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
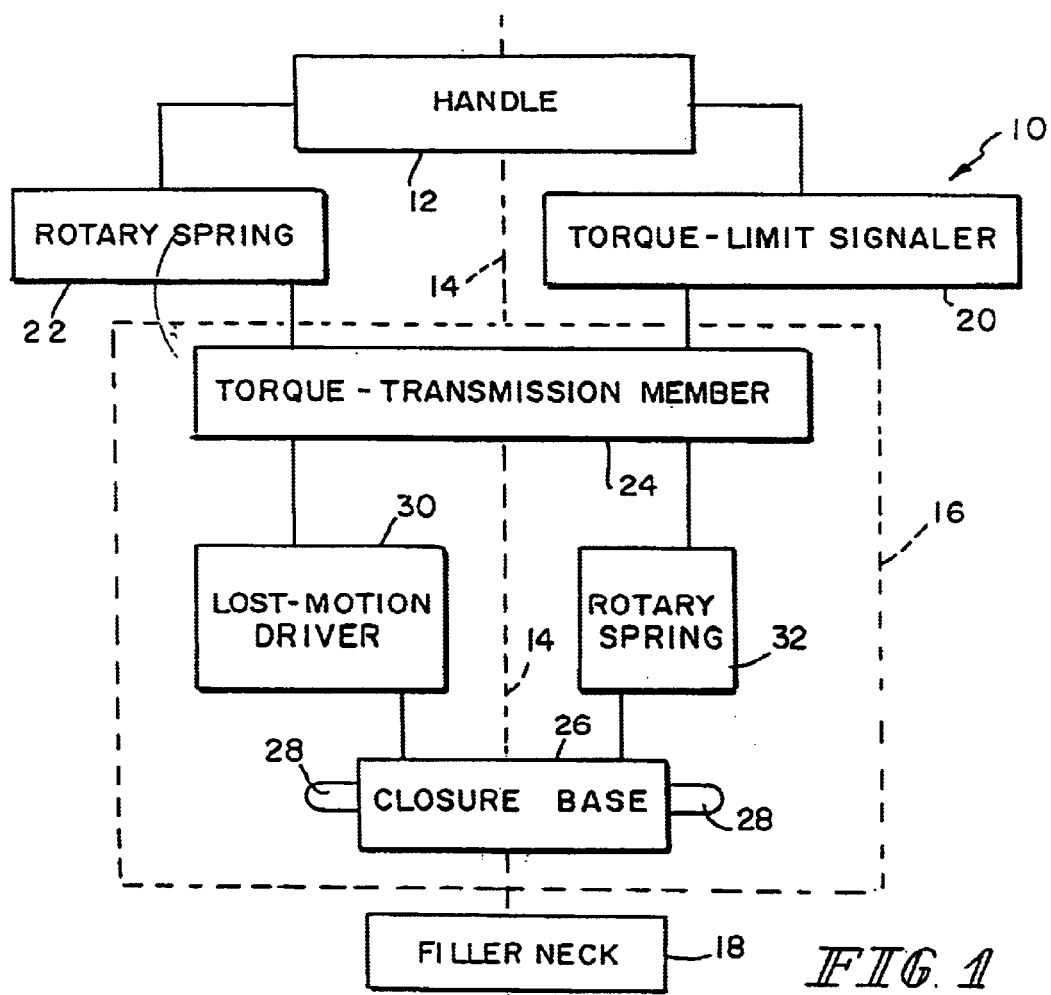
FIG. 1 is a block diagram of a torque-limit signal cap for a filler neck showing a handle and a filler neck closure (in phantom) comprising a torque-transmission member, a lost-motion driver, a rotary spring, and a closure base, and also showing a rotary spring and torque-limit signaler coupled to the handle and the filler neck closure.

Filler neck cap 10 includes a handle 12 rotatable about an axis of rotation 14, a closure 16 adapted to close a filler neck 18, and a torque-limit signaler 20 coupled to handle 12 and closure 16 as suggested in FIG. 1. Torque-limit signaler 20 operates to interrupt temporarily a driving (i.e., torque-transmitting) connection between handle 12 and closure 16 when closure 16 is seated properly in filler neck 18 during installation of cap 10 in filler neck 18 as shown, for example, in FIGS. 6 and 7. This temporary interruption functions to "signal" a user rotating the handle 12 in a clockwise, cap-advancing direction during installation of cap 10 in filler neck 18 that sufficient torque has been applied to handle 12 by the user during installation of closure 16 in filler neck 18 to seat closure 16 in a filler neck-closing position in filler neck 18. In an illustrative embodiment of torque-limit signaler 20, this "signal" is a "slipping" or "lost-motion" movement of a rotating handle 12 relative to a non-rotating closure 16 seated in a filler neck 18, a "snapping" or "clicking" sound associated with the start or end of such slipping, or both.

Once signaled by torque-limit signaler 20 that a preset torque limit has been exceeded, the user will understand that no further rotation of handle 12 in the clockwise, cap-advancing direction is required. The user will then release handle 12 at a position shown, for example, in FIG. 8. Once handle 12 is released, a rotary spring 22 included in cap 10 and coupled to handle 12 and closure 16 will apply a counterclockwise torque to handle 12 to cause handle 12 to rotate automatically in a counterclockwise direction about axis of rotation 14 to assume a predetermined orientation (shown, for example, in FIG. 10) with respect to filler neck 18 without "loosening" or "unseating" closure 16 in filler neck 18.

Figure 2:
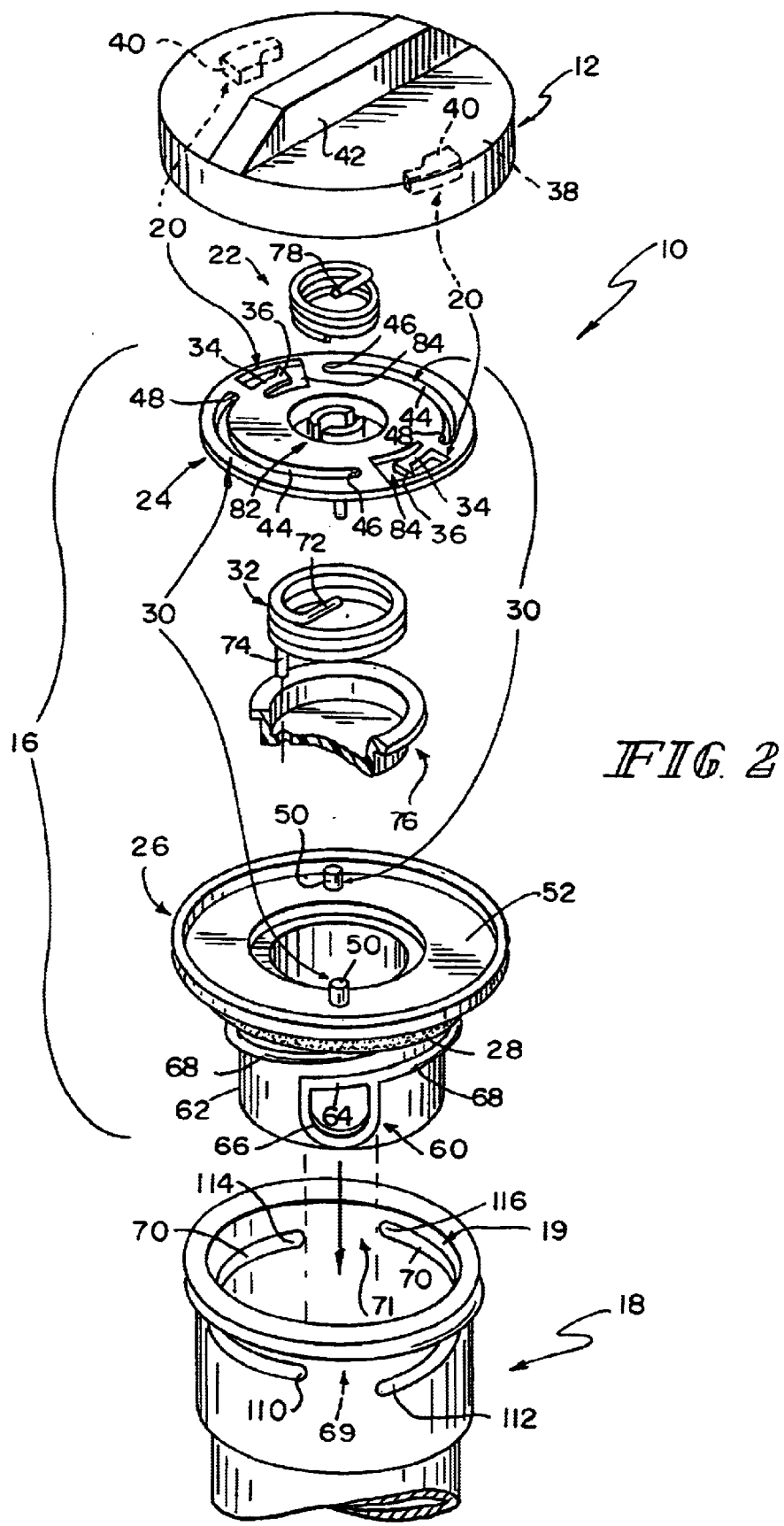
FIG. 2 is an exploded perspective view of a filler neck cap in accordance with the present disclosure, the cap including a handle, a small rotary spring, a torque-transmission member underlying the small torsion spring, a torque-limit signaler comprising a pair of drivers (shown in phantom) carried on the underside of the handle and a pair of deflectable spring arms, each spring arm being carried in a lost-motion signal slot formed in the torque-transmission member and being arranged to contact one of the drivers (shown in phantom) depending from the underside of the handle during rotation of the handle about an axis of rotation, a large rotary spring underlying the torque-transmission member, a spring mount underlying the large rotary spring, a closure base adapted to fit into an underlying filler neck to close an open mouth thereof, and a lost-motion driver comprising a pair of upstanding driven posts mounted on a radially extending flange of the closure base, each driven post being arranged to fit into an arcuate "lost-motion" drive slot formed in the torque-transmission member (which slot has a drive wall at each of its ends)
Figure 3:
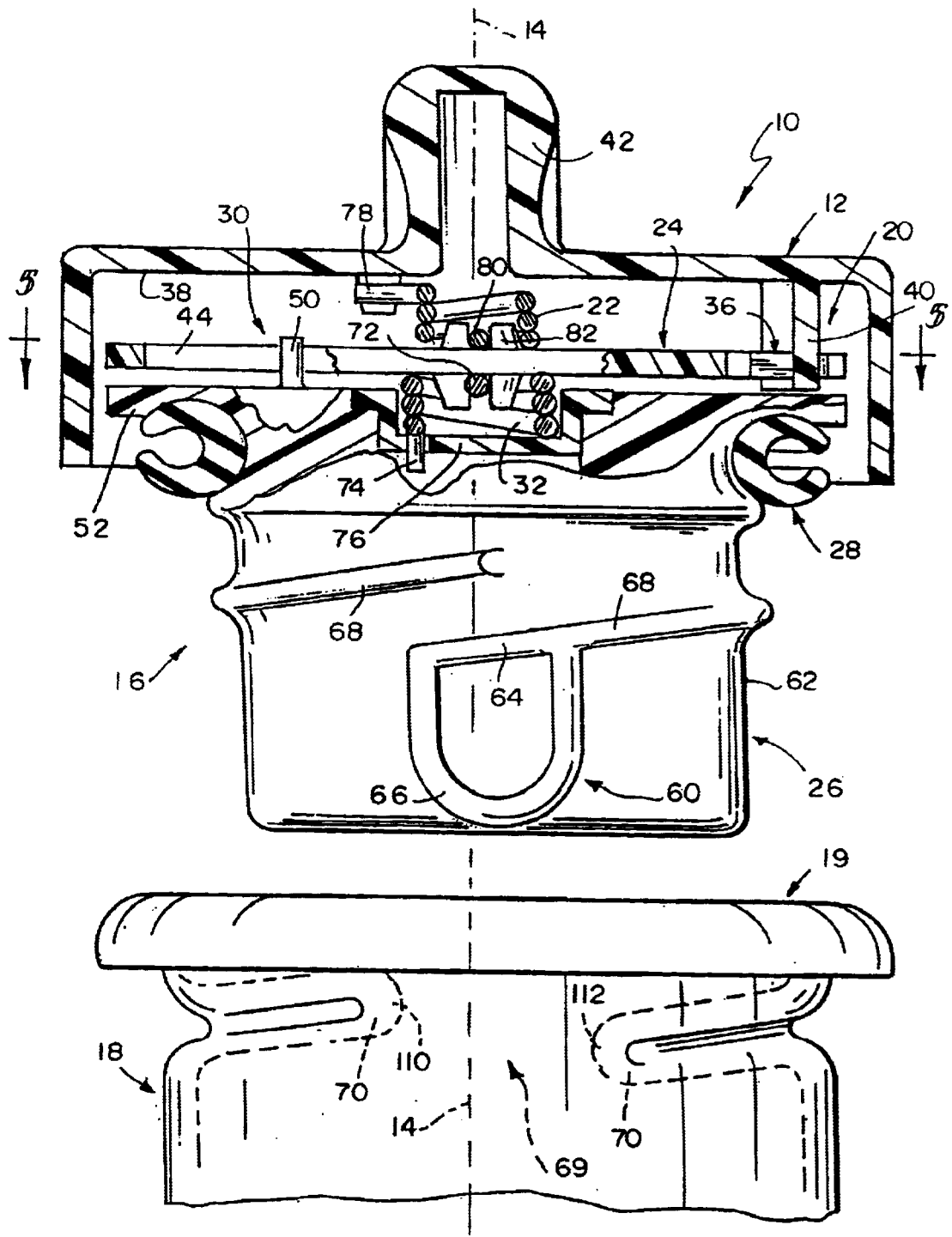
FIG. 3 is a side elevation view of the cap of FIG. 2 (after assembly) prior to insertion of the cap into the mouth of a filler neck.

Closure 16 comprises a torque-transmission member 24, a closure base 26 adapted to mate with filler neck 18, and an O-ring seal 28 carried on an outer surface of closure base 26 as shown diagrammatically in FIG. 1 and illustratively in FIGS. 2 and 3. Closure 16 also comprises a lost-motion driver 30 and a rotary spring 32, each of which is coupled to torque-transmission member 24 and to closure base 26.

Torque-limited signaler 20 is configured to provide a temporary torque-limited driving connection between handle 12 and torque-transmission member 24. Torque-limited signaler 20 transmits torque from rotatable handle 12 to torque-transmission member 24 to cause torque-transmission member 24 to turn in filler neck 18 during cap installation (in response to rotation of handle 12) until closure base 26 is installed in filler neck 18 and the torque applied by handle 12 to torque-transmission member 24 begins to exceed a predetermined or preset torque limit. Once the preset torque limit is exceeded, torque-limit signaler 20 produces an audible and/or tactile and/or other receivable signal to a user so that the user will know not to turn the cap 10 further in a clockwise, cap-advancing direction in filler neck 18, which could lead to "over-tightening" the cap 10 in the filler neck 18.

Torque-limited signaler 20 operates to signal over-tightening of closure base 26 in filler neck 18 to a user during cap installation in a filler neck, which over-tightening could lead to damage of the O-ring seal 28 positioned to lie between closure base 26 and filler neck 18. O-ring seal 28 is arranged to establish a sealed connection therebetween when cap 10 is rotated to assume an installed position within filler neck 18.

Figure 9A:
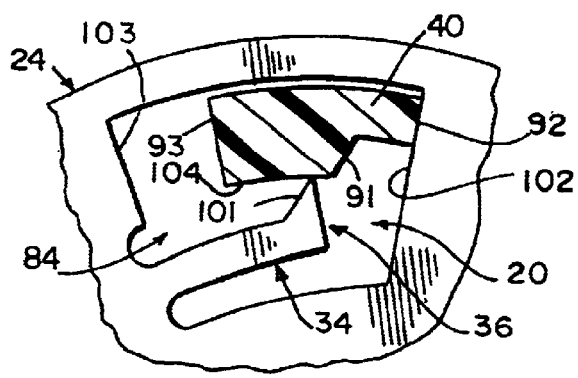
FIG. 9a is an enlarged view of a portion of FIG. 9 showing continued deflection of the spring arms after the torque transmitted from the cap handle to the torque-transmission member has exceeded the preset torque limit and showing movement of one of the drivers in the lost-motion signal slots formed in the torque-transmission member to cause a second drive surface of the driver to engage a second drive receiver (formed along an interior edge of the lost-motion signal slot) formed in the torque-transmission member so that the torque-transmission member would once again rotate in a clockwise direction if a user would continue to rotate the cap handle in a clockwise direction.

In an illustrative embodiment, torque-limited signaler 20 includes a pair of spring arms 34 coupled at one end to torque-transmission member 24 and provided with spring heads 36 at an opposite end, which spring heads 36 are arranged to contact drivers 40 depending from an underside 38 of handle 12 and "push off" from drivers 40 during cap installation to generate temporary lost-motion movement of handle 12 relative to torque-transmission member 24 once the torque applied to a rotatable filler neck cap 10 by a user during installation exceeds a preset torque limit. Each spring arm 34 is arranged to extend from an interior edge in torque-transmission member 24 into one of two lost-motion signal slots 84 formed in torque-transmission member 24 as shown, for example, in FIGS. 2, 5a, and 9a. Each spring arm 34 is movable in its lost-motion signal slot 84 from a driver-engaged position (shown, for example, in FIG. 5a) to a driver-disengaged position (shown, for example, in FIG. 9a).

If the torque transmitted from handle 12 to torque-transmission member 24 during cap installation increases to a level beyond a preset torque limit, the torque-limited driving connection provided by torque-limited signaler 20 "gives way" or is "broken" to produce an audible or tactile or other signal to the user and handle 12 begins to rotate independently of torque-transmission member 24 and closure base 26, which independent rotation is indicative of "lost-motion" movement of handle 12 relative to torque-transmission member 24 and closure base 26. Although continued rotation of handle 12 after the signal is produced and the lost-motion phase ends will cause further clockwise rotation of closure base 26 relative to filler neck 18, an audible or tactile signal is given to the user by torque-limit signaler 20 during the lost-motion phase to alert the user not to rotate handle 12 further in a clockwise, cap-advancing direction so as to protect O-ring seal 28 from unnecessary abrasion due to over-tightening of cap 10 in filler neck 18.

Users of filler neck caps outfitted with conventional torque-limited driving connections will recall that a characteristic repeated "clicking noise" is heard and a series of "clicking bumps" are felt by the user whenever the torque-limited driving connection is broken during cap installation and the cap handle (gripped by the user) begins to rotate freely with respect to the cap closure in the filler neck, thus absorbing "excess torque" while maintaining the handle intact within the cap.

In the present disclosure, torque-limited signaler 20 is configured to yield only one "click" (or a selected limited number of "clicks") after the torque-limited driving connection in the cap is broken to provide a "limited-rotation" torque-control system in a filler neck cap. Users of cap 10 will thus hear an abbreviated clicking noise and have an abbreviated tactile clicking sensation whenever the torque-limited driving connection is broken in response to over-torquing or over-tightening cap handle 12 during cap installation. By using such a torque-limited signaler 20, the position of cap handle 12 on filler neck 18 during cap installation at the time the torque-limited driving connection is broken can be controlled so that a torsion spring or other suitable handle rotator (see rotary spring 22) can be used to rotate handle 12 relative to filler neck 18 to cause a handle grip 42 on handle 12 to assume a selected "horizontal" orientation as shown, for example, in FIG. 10 whenever the user releases the handle grip 13 during cap installation after hearing or feeling a single click (or limited number of clicks) following "breakage" of the torque-limited driving connection.

In illustrative embodiments, cap 10 also includes a lost-motion driver 30 configured to provide a lost-motion driving connection between torque-transmission member 24 and closure base 26 so that initial rotation of handle 12 and torque-transmission member 24 in a counterclockwise, cap-removal direction through a predetermined angle does not impart any rotational movement to closure base 26 sufficient to break a sealed connection between closure base 26 and filler neck 18.

Lost-motion driver 30 includes a pair of arcuate "banana-shaped" lost-motion drive slots 44 formed in torque-transmission member 24 to include first and second drive walls 46, 48 at opposite ends of the drive slots 44 and upstanding driven posts 50 coupled to a radially extending flange 52 included in closure base 26 and arranged to extend into the arcuate lost-motion drive slots 44. The spacing between the first and second walls 46, 48 of the lost-motion drive slot 44 controls the amount of "lost motion" generated in cap 10 during a first stage of cap removal (shown, for example, in FIGS. 12 and 13) before a direct-drive driving connection is established during a second stage of cap removal (as shown, for example, in FIGS. 14 and 15). Lost-motion driving connections are disclosed in U.S. Pat. Nos. 5,449,086 and 5,638,975 and International (PCT) Publication No. WO 00/20292, which disclosures are hereby incorporated by reference herein.

A pair of position-locator lugs 60 is appended to an exterior surface of closure shaft 62 of closure base 26 as shown, for example, in FIGS. 2 and 3. The position-locator lugs 60 are arranged in spaced-apart relation to one another so that each position-locator lug 60 includes an inclined (with respect to the horizontal) flange guide 64 and a rounded guide edge 66 depending from flange guide 64 as shown best in FIGS. 2 and 3. One position-indicator lug 60 is positioned to lie about 180° away from the other position-indicator lug 60 about the circumference of cylindrical exterior surface of shaft 62. Closure threads 68 are formed on closure shaft 62 as shown in FIGS. 2 and 3 and operate to mate with the filler neck threads 70 in filler neck 18. When closure 16 is inserted into open mouth 19 of filler neck 18, one position-locator lug 60 will pass downwardly into a lug-receiving space 69 located between adjacent ends 110, 112 of filler neck threads 70 and the other position-locator lug 60 will pass downwardly into a lug-receiving space 71 located between adjacent ends 114, 116 of filler neck threads 70 as suggested in FIG. 2. Reference is hereby made to U.S. Pat. No. 6,079,584 for additional disclosure relating to the function and operation of position-locator lugs 60 and flange guide 64, closure threads 68, and filler neck threads 70, which disclosure is hereby incorporated by reference herein.

A rotary spring 32 (e.g., torsion spring) is positioned to lie between torque-transmission member 24 and closure base 26. Rotary spring 32 has an upper end 72 coupled to torque-transmission member 24 and a lower end 74 coupled to a spring mount 76 anchored to closure member 26. Rotary spring 32 functions to rotate closure base 26 relative to torque-transmission member 24 each time cap 10 is removed from filler neck 18 to "reset" cap 10 automatically so that a direct-drive relationship between torque-transmission member 24 and closure base 26 is established before and during each cap-installation activity.

A smaller rotary spring 22 (e.g., torsion spring) is positioned to lie between cap handle 12 and torque-transmission member 24. Rotary spring 22 has an upper end 78 coupled to cap handle 12 and a lower end 80 coupled to a spring mount 82 formed in the center of torque-transmission member 24. Rotary spring 22 functions to rotate the handle grip 42 of cap handle 12 from the orientation shown in FIG. 8 to the orientation shown in FIG. 10 when a user releases a handle grip 42 following cap installation.

Drivers 40 appended to an underside 38 of cap handle 12 and shown in phantom in FIG. 2 cooperate with cantilevered spring arms 34 positioned to lie in lost-motion signal slots 84 formed in torque-transmission member 24 and cooperate to provide a torque-limited driving connection between cap handle 12 and torque-transmission member 24. Each driver 40 includes a first drive surface 91, a second drive surface 92, and a third drive surface 93, as shown best in FIGS. 5a and 9a, and is sized to move back and forth in a lost-motion signal slot 84 formed in torque-transmission member 24.

Torque-transmission member 24 is formed to include a first drive receiver 101 on each spring head 36 of spring arms 34. Torque-transmission member 24 is also formed to include a second drive receiver 102 arranged to lie along one edge of lost-motion signal slot 84 and a third drive receiver 103 arranged to lie along another edge of lost-motion signal slot 84 as shown, for example, in FIGS. 5a and 9a. Driver 40 is sized to be able to move back and forth in lost-motion signal slot 84 to cause second drive surface 92 of driver 40 to abut second drive receiver 102 during installation of cap 10 into the filler neck as shown, for example, in FIG. 9. Driver 40 is also sized to move in lost-motion signal slot 84 to cause third drive surface 93 of driver 40 to abut third drive receiver 103 during removal of cap 10 from filler neck 18 as shown, for example, in FIGS. 11, 13, and 15.

Figure 4:
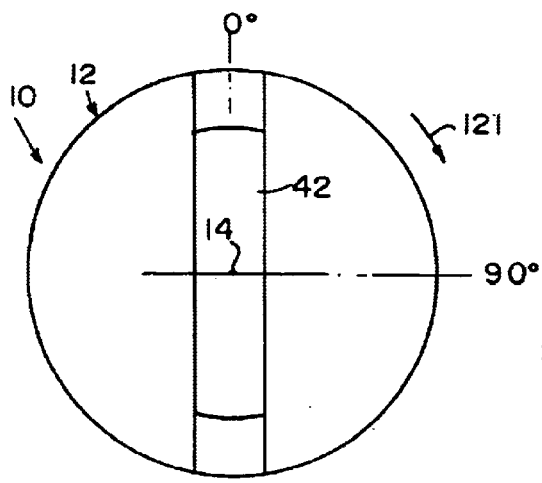
FIG. 4 is a top plan view of the cap of FIG. 3 showing an initial orientation of a handle grip carried on a top side of the cap handle prior to insertion of the cap into the filler neck.

Installation of cap 10 in filler neck 18 will now be described with reference to an illustrative embodiment shown in FIGS. 4–11. A user will orient handle 12 so that handle grip 42 is "vertical" as shown in FIG. 4 and then insert cap 10 into filler neck 18. This initial position is identified herein and in the drawings as the "0°" (i.e., zero degrees) position.

Figure 5A:
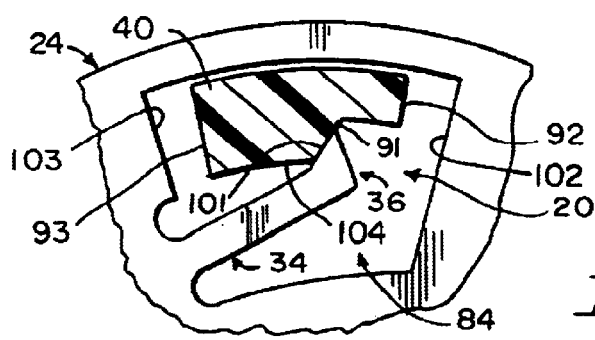
FIG. 5a is an enlarged view of a portion of FIG. 5 showing one of the lost-motion signal slots formed in the torque-transmission member and showing rotation of the cap handle in a clockwise cap-advancing direction to cause a ramp face on one of the drivers to engage a spring head on the free end of a companion spring arm extending into the lost-motion signal slot to establish a torque-limited driving connection between the cap handle and the torque-transmission member when the cap handle is rotated in the clockwise cap-advancing direction.
Figure 5:
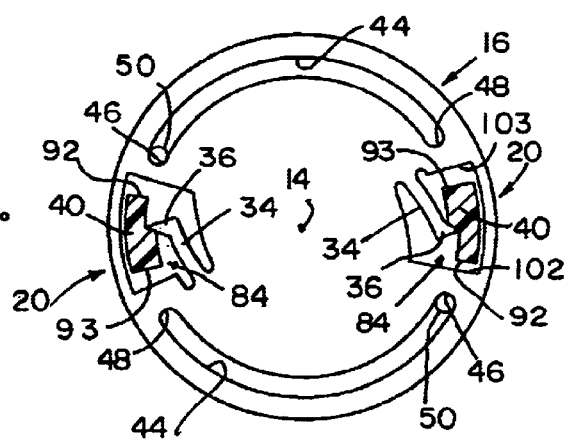
FIG. 5 is a transverse sectional view taken along line 5—5 of FIG. 3 showing an illustrative initial position of each of the two drivers (shown in section) carried on the underside of the handle in two lost-motion signal slots formed in the torque-transmission member, the two spring arms, and the two upstanding driven posts in two arcuate "banana-shaped" lost-motion drive slots formed in the torque-transmission member and showing that a first drive surface (defined by a ramp face) of each driver is positioned to engage a first drive receiver (defined by a spring arm) formed in the torque-transmission member so that the torque-transmission member will rotate in a clockwise direction in response to rotation of the cap handle in a clockwise direction until a preset torque limit is exceeded.
Figure 6:
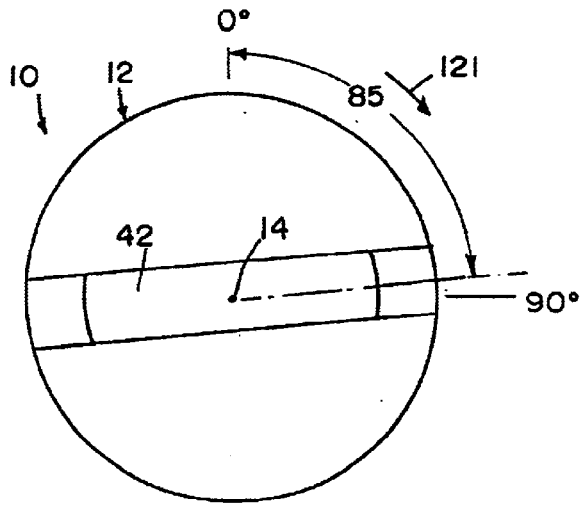
FIG. 6 is a view similar to FIG. 4 of the cap handle after it has been rotated about 85° to cause the closure base to be positioned "snugly" within the filler neck.
Figure 7:
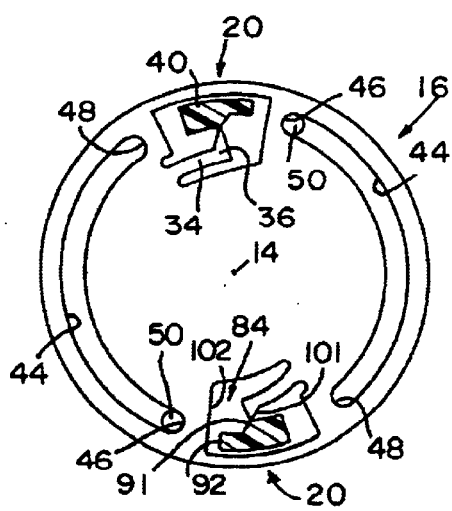
FIG. 7 is a view similar to FIG. 5 when the cap handle is in the position shown in FIG. 6 showing deflection of the spring arms after the torque transmitted from the cap handle to the torque-transmission member has exceeded the preset torque limit causing the spring heads to slide up the ramp faces and then disengage the ramp faces to "break" the driving connection between the cap handle and the torque-transmission member (and move to a driver-disengaged position) so as to provide a limited lost-motion signal to a user rotating the handle during installation of a cap in a filler neck to indicate that sufficient torque has been applied to the handle during installation of the closure in a filler neck to seat the closure in a filler neck-closing position in the filler neck.

To install cap 10, the user rotates handle 12 about axis 14 in a clockwise, cap-advancing direction 121 from the initial position shown in FIGS. 4 and 5 toward a position shown in FIGS. 6 and 7 wherein closure base 26 (and O-ring seal 28 carried thereon) are seated snugly in a filler neck-closing position in filler neck 28. Handle 12 rotates through an angle 85 of about 85° to assume this snug position.

As handle 12 is being turned about axis 14 through angle 85, first drive surface 91 on each driver 40 contacts first drive receiver 101 on spring head 36 of a companion spring arm 34 to apply a torque to rotate torque-transmission member 24 about axis 14 in a clockwise direction. At this stage, each spring arm 34 occupies its driver-engaged position as shown, for example, in FIGS. 5 and 5a. This clockwise rotation of torque-transmission member 24 causes each first drive wall 46 on torque-transmission member 24 to contact one of the driven posts 50 on closure base 26 so as to apply a torque to rotate closure base 26 about axis 14 in a clockwise direction. This torque causes closure base 26 to rotate and seat in filler neck 18.

First drive surface 91 and first drive receiver 101 are each defined by inclined surfaces or ramps which mate with one another as shown, for example, in FIGS. 5 and 5a to establish a torque-limited driving connection therebetween. If a user applies a clockwise torque to handle 12 in excess of a preset torque limit, each inclined first drive surface 91 will slip on a mating inclined first drive receiver 101 to cause each spring arm 34 to deflect and move in lost-motion signal slot 84 from the driver-engaged position shown in FIGS. 5 and 5a to the driver-disengaged position shown in FIGS. 7, 9, and 9a. In the driver-disengaged position, each spring head 36 contacts an inner surface 104 of a companion driver 40 as shown, for example, in FIG. 9a so that torque-transmitting contact between first drive surfaces 91 on drivers 40 and companion first drive receivers 101 on spring heads 36 is "broken."

Figure 8:
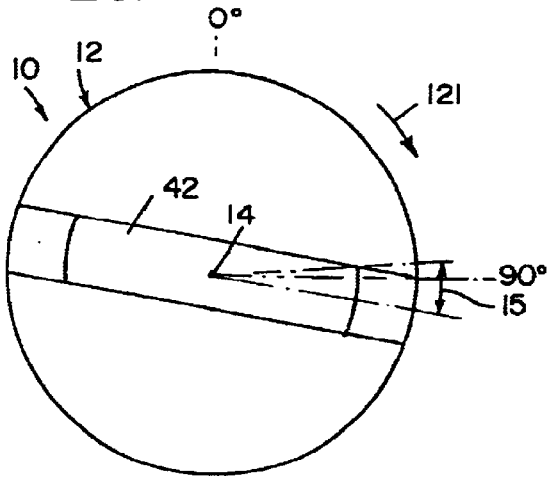
FIG. 8 is a view similar to FIG. 4 of the cap handle after the handle has been rotated another 15° from the position shown in FIGS. 6 and 7 and the handle grip has rotated in a clockwise direction "past" a horizontal position.
Figure 9:
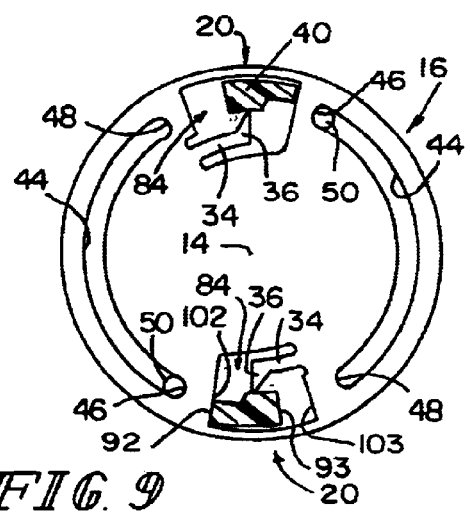
FIG. 9 is a view similar to FIG. 5 when the cap handle is in the position shown in FIG. 8 showing that each driver has moved further in a clockwise direction in its lost-motion signal slot to engage an interior edge formed in the torque-transmission member.

As shown now in FIGS. 8 and 9, continued clockwise rotation of handle 12 about axis 14 through an angle 15 of about 15°—past a quarter-turn position identified by 90° (ninety degrees)—will be sufficient to cause second drive surface 92 on each driver 40 to contact a companion second drive receiver 102 on torque-transmission member 24. The user will sense tactily that lost motion between handle 12 and torque-transmission member 24 has occurred and may hear a noise associated with movement of spring arms 34 to the driver-disengaged positions and/or a noise associated with contact between the second drive surfaces 92 on drivers 40 and the second drive receivers 102 on torque-transmission member 24. These torque-limit signals are provided to the user so that the user will now release handle 12 when it is in the position shown in FIG. 8.

Figure 10:
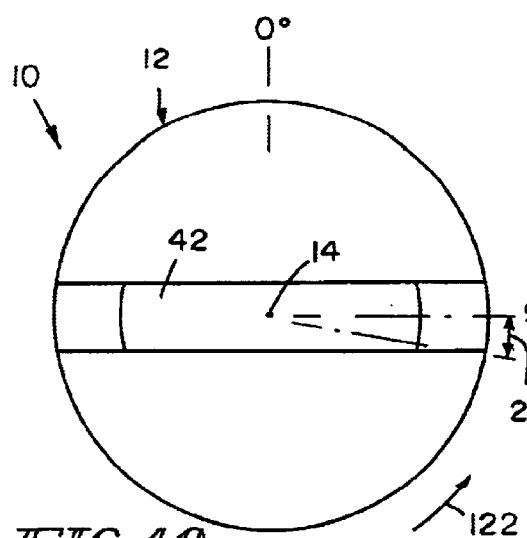
FIG. 10 is a view similar to FIG. 4 of the cap handle after the cap has been installed fully in the filler neck by a user and the cap handle has then been "released" by the user allowing the small rotary spring to rotate the cap handle about 10° in a counterclockwise direction from the position shown in FIG. 8 to assume a predetermined position with respect to the filler neck wherein the handle grip is arranged to lie in a "horizontal" orientation that is perpendicular to the initial handle grip orientation shown in FIG. 4.
Figure 11:
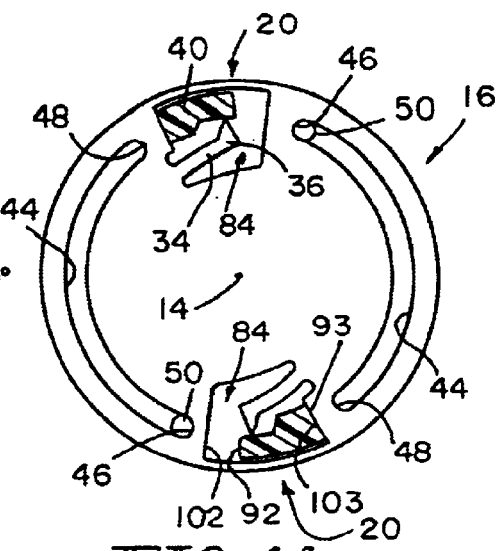
FIG. 11 is a view similar to FIG. 5 when the cap handle is in the position shown in FIG. 10 showing that the drivers carried on the underside of the handle have been moved in their lost-motion signal slots formed in the torque-transmission member by the small rotary spring to cause a third drive surface of the drivers to engage a third drive receiver formed along another interior edge of each lost-motion signal slot formed on the torque-transmission member.

By comparing FIGS. 8 and 10, it will be observed that once the user releases handle 12, the handle 12 will rotate automatically about axis 14 in a counterclockwise direction 122 under a torque generated and applied by rotary spring 22 to handle 12. This torque will cause handle 12 to rotate through an angle 210 of 10° and cause each driver 40 to move counterclockwise in its lost-motion signal slot 84 until the third drive surface 93 on each driver 40 contacts a companion third drive receiver 103 on torque-transmission member 24. This action will prepare cap 10 for removal by establishing a direct-drive connection in counterclockwise direction 122 between handle 12 and torque-transmission member 24 as shown in FIG. 11 and will also cause handle grip 42 to assume a visually pleasing horizontal orientation as shown in FIG. 10.

Figure 12:
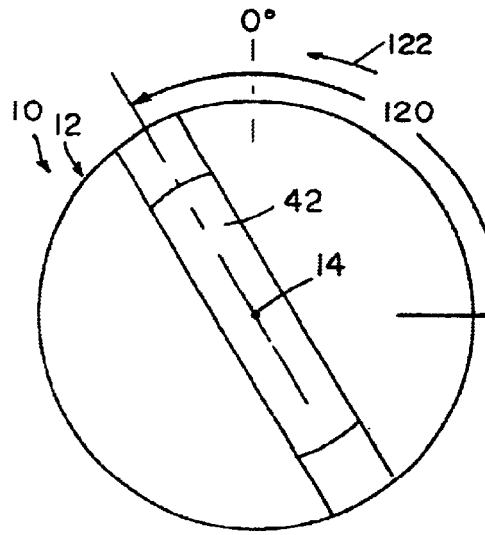
FIG. 12 is a view similar to FIG. 4 of the cap handle during a first lost-motion stage of cap removal after the cap handle has been rotated through a "lost-motion" stage in a counterclockwise cap-removal direction about 120° relative to the filler neck without any rotation of the underlying closure base relative to the filler neck.
Figure 13:
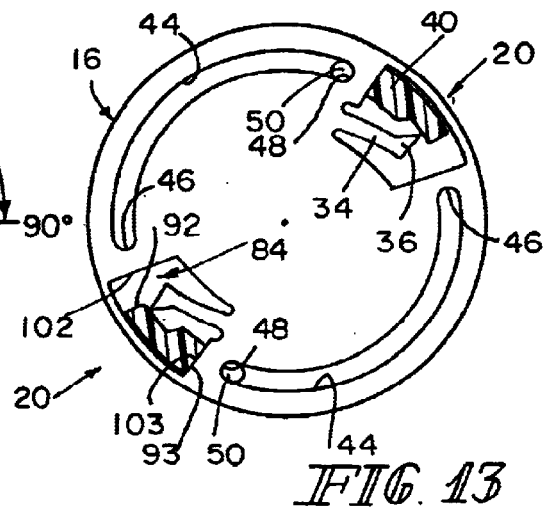
FIG. 13 is a view similar to FIG. 5 when the cap handle is in the position shown in FIG. 12 showing movement of the upstanding driven posts on the closure base from one end of the arcuate lost-motion drive slots to an opposite end of the arcuate lost-motion drive slots during rotation of the cap handle and torque-transmission member together as a unit relative to the underlying closure base.
Figure 14:
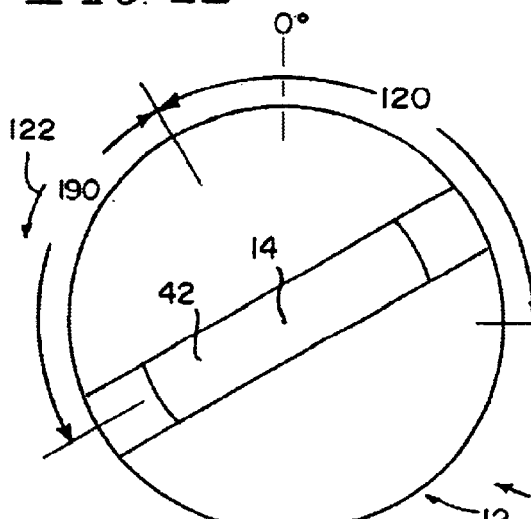
FIG. 14 is a view similar to FIG. 4 of the cap handle during a second direct-drive stage of cap removal after the cap handle has been rotated in the counterclockwise cap-removal direction another 90° relative to the filler neck to rotate the underlying torque-transmission member and closure base together as a unit to cause those components to disengage the filler neck to permit a user to remove the cap from the filler neck during refueling.
Figure 15:
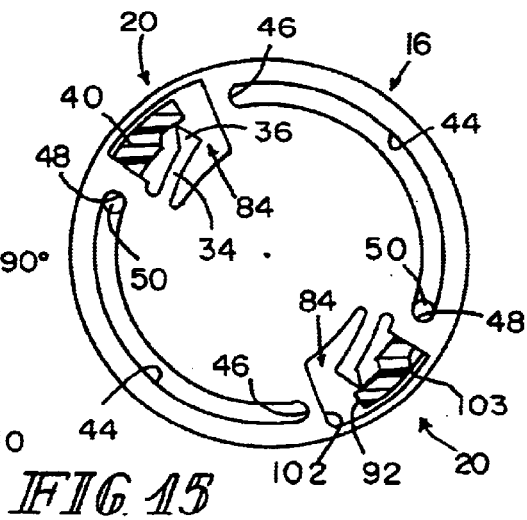
FIG. 15 is a view similar to FIG. 5 when the cap handle is in the position shown in FIG. 14.

Removal of cap 10 from filler neck 18 will now be described with reference to an illustrative embodiment shown in FIGS. 12–15. The user will rotate handle 12 about axis 14 in a counterclockwise, cap-removal direction 122 through a lost-motion angle 120 of about 120° as shown in FIGS. 12 and 13. The arc length of each arcuate "banana-shaped" lost-motion drive slot 44 is about 120° and causes lost-motion angle 120 to be 120°. Handle 12 is able to rotate independently of torque-transmission member 24 because the driven posts 50 are moving in the pin-receiving arcuate lost-motion drive slots 44 until the driven posts 50 contact second drive walls 48. The user now continues to rotate handle 12 in a counterclockwise, cap-removal direction 122 through a direct-drive angle 190 of about 90° to cause closure base 26 to rotate about axis 14 and disengage filler neck 18.

Although the invention has been disclosed in detail with reference to certain preferred embodiments, variations and modifications exist within the scope and spirit of the invention as recited in the following claims.

What is claimed is:

1. A torque-limit signal cap for a filler neck, the cap comprising
   a handle rotatable about an axis of rotation,
   a closure adapted to close the filler neck, and
   a torque-limit signaler coupled to the handle and the closure and configured to disable temporarily transmission of torque about the axis of rotation in a cap-advancing direction from the handle to the closure during rotation of the handle about the axis of rotation in the cap-advancing direction to signal a person rotating the handle that the closure is seated in a filler neck-closing position, the torque-limit signaler comprising
      a first drive receiver coupled to the closure for movement relative to the closure between a driver-engaged position and a driver-disengaged position,
      a driver coupled to the handle to rotate therewith and contact the first driver receiver in the driver-engaged position during rotation of the handle about the axis of rotation in the cap-advancing direction to cause the closure to rotate about the axis of rotation, the driver being configured to urge the first drive receiver from the driver-engaged position to the driver-disengaged position to allow limited lost-motion rotation of the handle relative to the closure once torque in excess of a predetermined amount is applied to the handle about the axis of rotation during continued rotation of the handle about the axis of rotation in the cap-advancing direction, and
      a second drive receiver coupled to the closure and located to contact the driver while the first drive receiver is maintained in the driver-disengaged position and after limited lost-motion rotation of the handle relative to the closure about the axis of rotation in the cap-advancing direction to produce a torque-limit signal indicating to a person rotating the handle about the axis of rotation in the cap-advancing direction that such limited lost-motion rotation of the handle relative to the closure about the axis of rotation has occurred and sufficient torque has been applied to the handle about the axis of rotation in the cap-advancing direction during installation of the closure in a flier neck to seat the closure in a filler neck-closing position in the filler neck.

2. The cap of claim 1, wherein the closure includes a closure base adapted to mate with the filler neck and a torque-transmission member positioned to lie between the handle and the closure base and rotate about the axis of rotation and the first drive receiver is coupled to the torque-transmission member to rotate therewith.

3. The cap of claim 2, wherein the first drive receiver includes a spring arm coupled at one end to the torque-transmission member and provided with a spring head at an opposite end that is arranged to maintain contact with the driver to provide a torque-limited connection during rotation of the handle about the axis of rotation in the cap-advancing direction.

4. The cap of claim 3, wherein the torque-transmission member is formed to include an interior edge defining a lost-motion signal slot, the spring arm is coupled to the interior edge to position the spring head for movement in the lost-motion signal slot as the first drive receiver is moved between the driver-engaged position and the driver-disengaged position, one portion of the interior edge defines the second drive receiver and another portion of the interior edge provides a third drive receiver arranged to contact the driver during rotation of the handle about the axis of rotation in a cap-removal direction that is opposite to the cap-advancing direction to provide a direct-drive connection in the cap-removal direction.

5. The cap of claim 3, wherein the driver includes separate first and second drive surfaces, the first drive surface is arranged to engage the spring head when the first drive receiver lies in the driver-engaged position, and the second drive surface is arranged to engage the second drive receiver following movement of the first drive receiver to the driver-disengaged position and limited lost-motion rotation of the handle relative to the closure.

6. The cap of claim 2, wherein the torque-transmission member is formed to include the second drive receiver.

7. The cap of claim 6, wherein the torque-transmission member is formed to include a lost-motion signal slot containing the first drive receiver therein and an interior edge defining a boundary of the lost-motion signal slot and providing the second drive receiver.

8. The cap of claim 6, wherein the torque-transmission member is formed to include a lost-motion signal slot containing the first drive receiver therein and an interior edge defining a boundary of the lost-motion signal slot and providing a third drive receiver arranged to contact the driver during rotation of the handle about the axis of rotation in a cap-removal direction that is opposite to the cap-advancing direction to provide a direct-drive connection in the cap-removal direction.

9. The cap of claim 2, wherein the torque-transmission member is formed to include an arcuate lost-motion drive slot and a lost-motion signal slot, the closure base includes a driven post positioned for movement in the arcuate lost-motion drive slot, and the driver is positioned to move in the lost-motion signal slot during rotation of the handle about the axis of rotation upon movement of the first drive receiver to the driver-disengaged position.

10. The cap of claim 9, wherein the first drive receiver includes a spring arm coupled at one end to the torque-transmission member and provided with a spring head at an opposite end that is arranged to maintain contact with the driver to provide a torque-limited connection during rotation of the handle about the axis of rotation in the cap-advancing direction.

11. The cap of claim 9, wherein the torque-transmission member is formed to include the second drive receiver.

12. The cap of claim 2, further comprising a rotary spring coupled to the handle and to the torque-transmission member.

13. The cap of claim 12, further comprising a rotary spring coupled to the torque-transmission member and to the closure base.

14. The cap of claim 2, further comprising a lost-motion driver comprising a first arcuate lost-motion drive slot formed in the torque-transmission member and a first driven post mounted on the closure base and arranged to extend into the first arcuate lost-motion drive slot and move therein along an arc length thereof during rotation of the torque-transmission member about the axis of rotation relative to the closure base.

15. The cap of claim 14, further comprising a rotary spring coupled at one end to the torque-transmission member and at another end to the closure base.

16. The cap of claim 1, further comprising a rotary spring coupled to the handle and to the closure.

17. The cap of claim 16, wherein the rotary spring is biased yieldably to urge the handle to rotate through a predetermined acute angle relative to the closure whenever a person rotating the handle in a cap-advancing direction releases the handle during cap installation after receiving the torque-limit signal.

18. The cap of claim 17, wherein the predetermined acute angle is about 15°.

19. A torque-limit signal cap for a filler neck, the cap comprising
a handle rotatable about an axis of rotation,
a closure adapted to close the filler neck, and
signal means for producing limited lost-motion movement of the handle relative to the closure through a predetermined acute angle during rotation of the handle in a cap-advancing direction about the axis of rotation following an initial rotation of the handle and closure together as a unit in the cap-advancing direction about the axis of rotation to provide a limited lost-motion signal to a user rotating the handle during installation of a cap in a filler neck to indicate that sufficient torque has been applied to the handle during installation of the closure in a filler neck to seat the closure in a filler neck-closing position in the filler neck, wherein the signal means includes a driver coupled to the handle, a movable drive receiver coupled to the closure for movement between a driver-engaged position and a driver-disengaged position, and a fixed drive receiver coupled to the closure and located to engage the driver upon movement of the movable drive receiver to the driver-disengaged position.

20. The cap of claim 19, wherein the closure is formed to include a lost-motion signal slot containing the movable driver receiver therein and an, interior edge defining a boundary of the lost-motion signal slot and providing the fixed drive receiver.

21. The cap of claim 20, wherein the movable drive receiver includes a spring arm coupled at one end to the closure and provided with a spring head at an opposite end that is arranged to maintain contact with the driver to provide a torque-limited connection during rotation of the handle about the axis of rotation in the cap-advancing direction, the handle includes a ceiling positioned to overlie the closure, and the driver is coupled to the ceiling to lie above the closure and contact the spring head during rotation of the handle about the axis of rotation.

22. The cap of claim 21, wherein the closure is formed to include a lost-motion signal slot containing the driver and the movable drive receiver therein and the closure is also fanned to include an interior edge defining a boundary of the lost-motion signal slot and providing the fixed drive receiver.

23. A torque-limit signal cap for a filler neck, the cap comprising
a handle rotatable about an axis of rotation,
a closure adapted to close the filler neck, and
signal means for producing limited lost-motion movement of the handle relative to the closure through a predetermined acute angle during rotation of handle in a cap-advancing direction about the axis of rotation following an initial rotation of the handle and closure together as a unit in the cap-advancing direction about the axis of rotation to provide a limited lost-motion signal to a user rotating the handle during installation of a cap in a filler neck to indicate that sufficient torque has been applied to the handle during installation of the closure in a filler neck to seat the closure in a filler neck-closing position in the filler neck, wherein the closure includes a closure base adapted to mate with the filler neck and a torque-transmission member positioned to lie between the handle and the closure base, the signal means includes a driver coupled to the handle and a movable drive receiver coupled to the torque-transmission member, and further comprising a rotary spring coupled to the handle and to the torque-transmission member and biased yieldably to urge the handle to rotate through a predetermined acute angle relative to the closure whenever a person rotating the handle in a cap-advancing direction releases the handle during cap installation after receiving the limited lost-motion signal.

24. The cap of claim 23, further comprising a lost-motion driver comprising a first arcuate lost-motion drive slot fanned in the torque-transmission member and a first driven post mounted on the closure base and arranged to extend into the first arcuate lost-motion drive slot and move therein along an arc length thereof during rotation of the torque-transmission member about the axis of rotation relative to the closure base.

25. The cap of claim 24, further comprising a rotary spring coupled at one end to the torque-transmission member and at another end to the closure base.

26. A torque-limit signal cap for a filler neck, the cap comprising
a handle rotatable about an axis of rotation,
a closure adapted to close the filler neck, and a torque-limit signaler coupled to the handle and to the closure and configured to provide means for temporarily interrupting a driving connection established between the handle and the closure to cause the handle to rotate through a predetermined acute angle about the axis of rotation relative to the handle once torque in excess of a predetermined amount is applied to the handle about the axis of rotation in a cap-advancing direction to provide a limited lost-motion signal to a user rotating the handle during installation of a cap in a filler neck to indicate that sufficient torque has been applied to the handle during installation of the closure in a filler neck to seat the closure in a filler neck-closing position in the filler neck and for reestablishing the driving connection between the handle and the closure after the handle has been rotated through the predetermined acute angle to discontinue provision of the limited lost-motion signal to the user.

* * * * *